INVENTOR
FRANK B. HARLEY
BY
ATTORNEYS

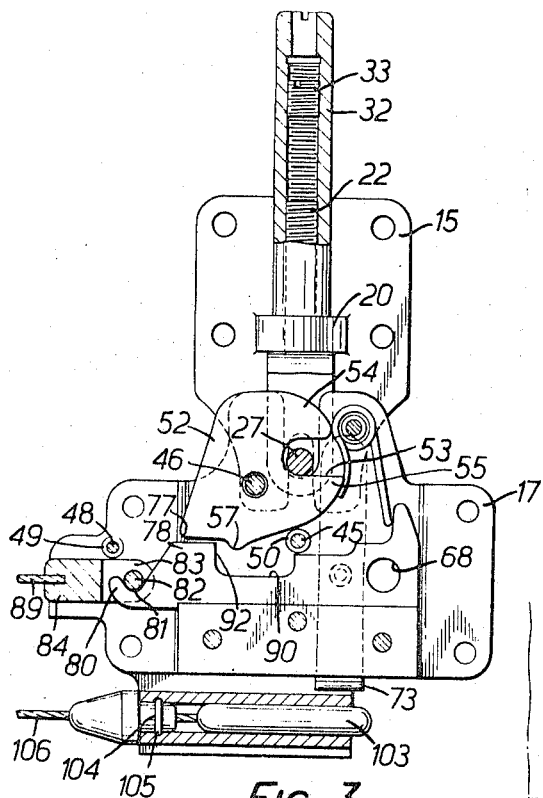
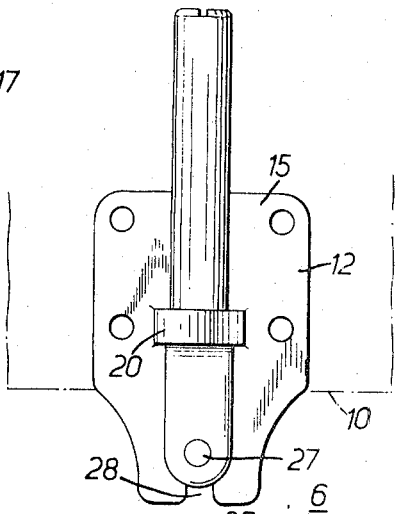
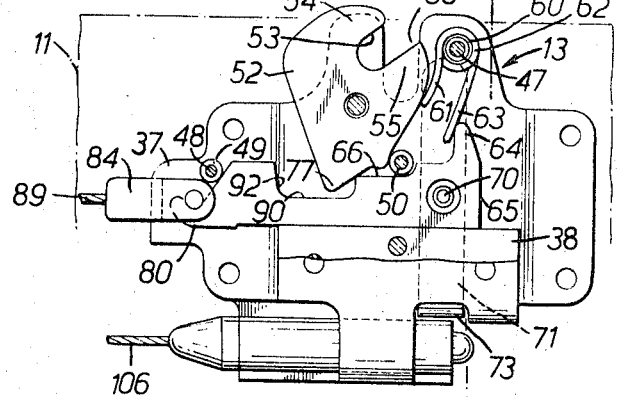
FIG. 3.
FIG. 4.
INVENTOR
FRANK B. HARLEY
ATTORNEYS Sept. 15, 1970  F. B. HARLEY  3,528,694
RELEASABLE FASTENERS AND RELEASE UNITS
INCORPORATING SUCH FASTENERS Filed April 11, 1968  3 Sheets-Sheet 3

United States Patent Office 3,528,694
Patented Sept. 15, 1970

3,528,694
RELEASABLE FASTENERS AND RELEASE UNITS INCORPORATING SUCH FASTENERS
Frank Bernard Harley, Egham, England, assignor of one-half to Harley Patents (International) Limited, London, England, a company of Great Britain
Filed Apr. 11, 1968, Ser. No. 720,544
Claims priority, application Great Britain, Apr. 20, 1967, 18,223/67
Int. Cl. E05c 3/06, 3/04
U.S. Cl. 292—216          7 Claims

ABSTRACT OF THE DISCLOSURE

A releasable fastener is disclosed, specifically for use for connecting two halves of an inflatable dinghy, the fastener having a retaining catch movement of which is governed by a locking piece. The locking piece in turn is actuated by a cable which can be readily disconnected from the locking piece once the fastener is actuated opened to allow opening of the dinghy.

---

This invention relates to releasable fasteners and release units incorporating such fasteners and is particularly concerned with such fasteners and units which are employed releasably to connect two halves of a casing of an inflatable dinghy. Such dinghies are used for a variety of purposes and it is usually necessary to ensure speedy inflation by the manual release of the release unit. Naturally in many circumstances wherein a dinghy of this nature may be used a life might be at stake and, therefore, it is of particular concern to ensure a construction wherein the two halves of the casing can always be separated and, accordingly, it is another object of the persent invention to provide a secondary form of release for this purpose.

According to one aspect of the present invention a releasable fastener comprises a body having a retaining catch mounted thereon for movement between a latching position, in which the catch can retain another part to the body, and a release position in which such part can separate from the body, a locking piece mounted for movement between first and second positions, in the first of which movement of the retaining catch from the latching position to the release position is prevented, and in the second of which such movement is permitted, a release member being connected to the locking piece and being so arranged that a force applied to the release member can move the locking piece from the first to the second position, the release member being capable of ready disconnection from the locking piece when the latter is in its second position but not when it is in its first position.

Latching means is preferably provided to retain the locking piece in its second position. In this way the release member may be readily connected again to the locking piece whereafter release of the latching means will enable the locking piece to return to its first position. The latching means may, for example, comprise a spring biased member carried by the body and having a shoulder which is arranged to inter-engage a further shoulder on the locking piece. For example the spring-biased member may comprise a leaf spring having one end secured to the body and carrying a stud adjacent its free end which is arranged to co-operate with the margin of a hole in the locking piece.

A spring may be provided to bias the retaining catch to its release position and a spring may be provided to bias the locking piece to its first position. In a particularly convenient arrangement these two springs are one and the same.

In order to provide for the secondary release referred to above the body together with its retaining catch and locking piece may be secured to a further member by a readily releasable connection and this connection may comprise a pin passing through aligned apertures in the body and the further member, retaining means being provided to hold the pin in the apertures but the pin being capable of manual withdrawal.

According to another aspect of the present invention a release unit may incorporate a fastener as referred to above together with a further member (forming the said other part) and comprising a support upon which a locking member capable of engagement with the retaining catch is adjustably mounted. Such an arrangement enables the two halves of the casing of an inflatable dinghy to be drawn together after the locking member is engaged with the retaining catch.

The invention may be carried into practice in various ways but one specific embodiment will now be described by way of example with reference to the accompanying drawings in which, FIG. 1 is a side elevation of a release unit for the two separable halves of a casing of an inflatable dinghy;

FIG. 3 is a view of the release unit which is similar to FIG. 1 but is partly in section to show certain parts thereof in a locked position;

FIG. 4 is a view similar to FIG. 3 but showing the two main sections of the unit in a separated condition;

Figure 1:
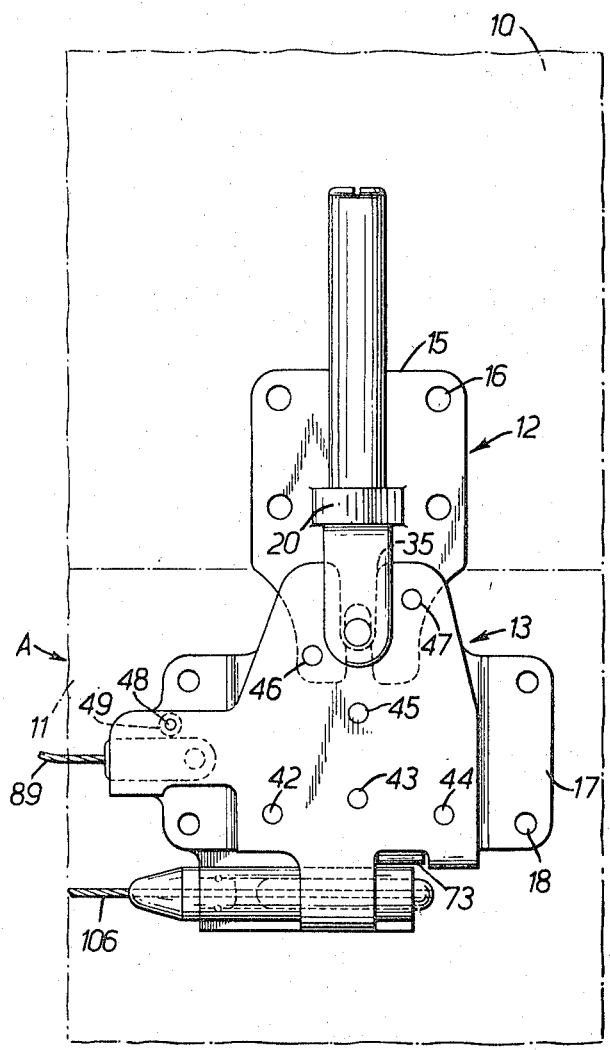

The release unit illustrated in the drawings is applied to upper and lower halves 10 and 11 of a casing of an inflatable dinghy. Normally these two halves are maintained in the position shown in FIGS. 1 and 2 by the release unit in its locked position but the two halves can pivot apart to permit inflation when upper and lower sections 12 and 13 respectively of the release unit are separated in the manner shown in FIG. 4.

For this purpose the upper half 10 has secured to it an upper securing member 15 by means of four bolts 16 and the lower half 11 has secured to it a lower securing member 17 by means of bolts 18. The form of the lower securing member 17 is also clearly shown on the lower part of FIG. 5 and also to the right in FIG. 6, or to the left in FIG. 2.

Figure 2:
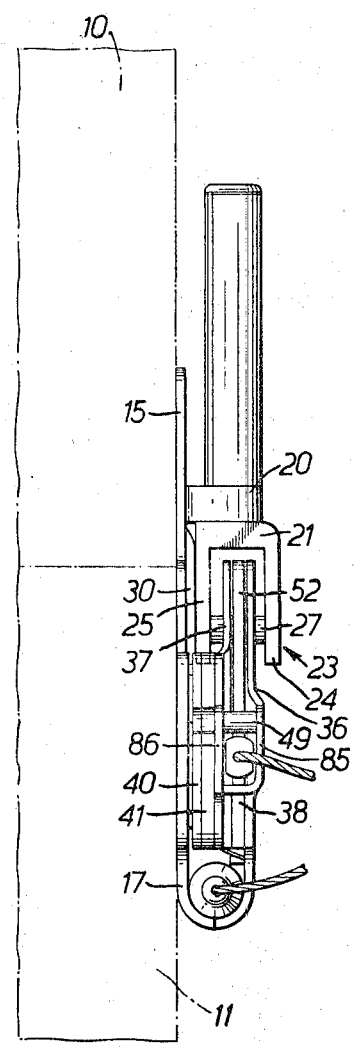
FIG. 2 is an end elevation of the release unit of FIG. 1 viewed in thet direction of the arrow "A" in FIG. 1.

Welded to the front face of the upper securing member 15 is a collar 20 through which can slide a threaded rod 22 (seen in FIG. 3) and which, as shown in FIG. 2, extends upwards from the base 21 of an inverted U shaped bail 23 having a front arm 24 and a rear arm 25 which are inter-connected by a locking pin 27. The rear end of this pin extends beyond and to the rear of the rear arm 25 and through a slot 28 extending upwards from the lower end of the upper section 12 (see FIG. 4) a head of the bolt, which is not shown, sliding in a recess formed in the rear of the upper section 12. This recess is formed by a pressed out portion 30 shown in FIG. 2. Mounted on the threaded rod 22 is a sleeve formed with a co-operating screw-thread to permit limited movement of the bail 23 to provide for adjustment of the relative positions of the upper and lower sections 12 and 13 of the release unit after they have been engaged, thereby to draw the upper and lower casing halves 10 and 11 together whereafter further rotation of the sleeve 32 with respect to the rod 22 can be prevented by means of a lock screw 33 to which access can be gained through the upper end of the sleeve 32.

It will be seen from FIGS. 1 and 2 that the locking pin 27 extends below the meeting line of the two halves 10 and 11 of the dinghy casing and in the engaged position of FIGS. 1, 2 and 3 the locking pin 27 passes into an open-ended upwardly facing slot 35 which is also clearly shown in FIG. 4. This slot is formed in both a front plate 36 and an intermediate plate 27 which are aligned in spaced relationship as shown in FIG. 2, the spacing being maintained by various spacers at different points, a forward spacer 38, for example, being seen at the lower end of FIG. 2. A further, rear, plate 40 is situated behind the intermediate plate 37 but is separated from the intermediate plate at each end by means of rear spacers 41 and the three plates 36, 37 and 40 are secured together by means of seven rivets 42 and 48. Surrounding the rivet 48 is a collar 49 which is seen clearly in FIG. 2 and which also acts as one of the spacers between the plates 36 and 37. A similar spacer collar 50 surrounds the rivet 45 as shown in FIG. 3 and, as will be described, this forms a stop.

Mounted for limited rotary movement about the rivet 46 is a hook 52 which is situated between the plates 36 and 37 as shown in FIG. 2. The hook has at one point in its circumference a jaw 53 formed by spaced portions 54 and 55. In an open position of the hook 52, which is shown in FIG. 4, the arm 55 of the hook bridges the slot 35, but the arm 54 does not do so, so that in this position of the hook the locking pin 27 is capable of insertion into the slot 35 whereafter it can bear on the surface of the jaw afforded by the arm 55 of the jaw and rotate the hook to the locked position shown in FIG. 3 wherein the other arm 54 of the jaw also bridges the slot 35 to trap the locking pin 27 within the jaw 53 and the slot 35. As will be seen from FIGS. 3 and 4 the hook 52 has on its underside a small protuberance 57 which engages the collar 50 in its released position of FIG. 4 to prevent further anti-clockwise rotation of the hook 52 under the influence of a coil spring 60 which has one arm 61 bearing on a surface of the hook 52, a coiled section 62 surrounding the rivet 47 and its other end forming an arm 63 for engagement with an upward extension 64 of a locking piece 65 which is mounted for rectilinear movement between the plates 36 and 37. The lower surface of the locking piece 65 rests on and is guided by the forward spacer 38 and the upper side of the locking piece 65 is guided during this translational movement between locked and released positions by the engagement of the collar 50 on an upper surface 66 of the locking piece.

Figure 5:
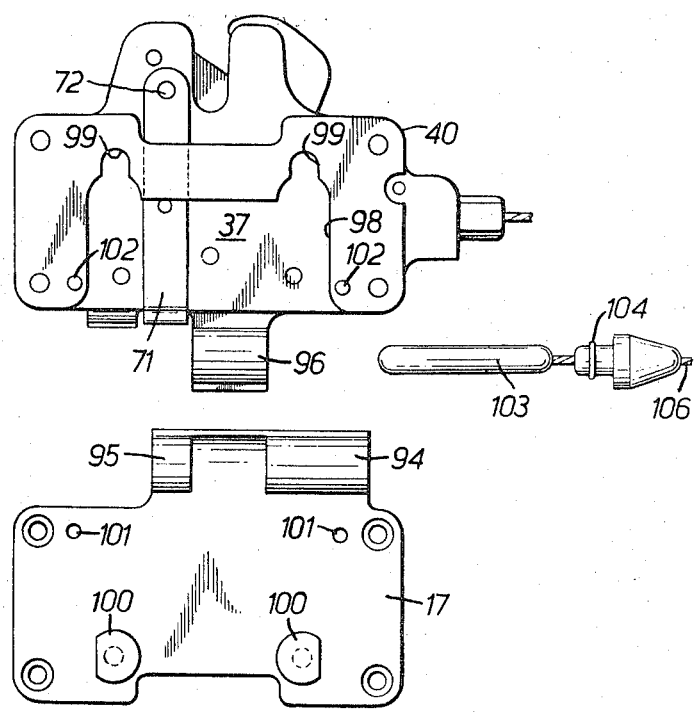
FIG. 5 shows the form of a front part of the lower section as viewed from the rear but with a rear part of the lower section detached and turned through 180° to show the rear part in an inverted disposition and as would normally be viewed from the front.
Figure 6:
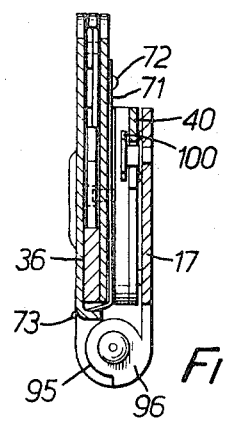
FIG. 6 is a sectional side elevation of the lower section as viewed on the line 6—6 of FIG. 4.

The locking piece, as shown in FIG. 3, has at its right-hand end, as viewed in that figure, a circular aperture 68 which in the released position of the locking piece 65, which is shown in FIG. 4, is in alignment with a stud 70 secured to a leaf spring 71 which lies to the rear of the intermediate plate 37 as shown in FIGS. 5 and 6. The leaf spring is riveted to the intermediate plate 37 adjacent its upper end by means of a rivet 72 and the lower end of the leaf spring is turned through substantially a right-angle as shown in FIG. 6 to extend forwardly and protrude slightly from the front face of the front plate 36. Thus the leaf spring affords a forward projecting surface 73 which can be pressed by means of finger or thumb in a rearwards direction to move the spring rearwards to disengage the stud 70 from the aperture 68 in the locking piece 65. When such disengagement occurs with parts otherwise in the position shown in FIG. 4 the tension within the spring 60 will cause the locking piece 65 to move to the right to the position shown in FIG. 3.

In the position of FIG. 3 a corner region 77 of the hook 52 lies above an upward projection 78 of the locking piece so preventing anti-clockwise rotation of the hook. At this time, however, it will be appreciated that, with the stud 70 and the aperture 68 out of alignment, the locking piece 65 can be drawn to the left and for this purpose the left-hand end of the locking piece is provided with a hooked portion 80 which affords a recess 81 to receive a transverse pin 82 extending between forked end sections 83 of a release catch 84. The catch is mounted for sliding movement between the positions of FIG. 3 and FIG. 4 by location between outwardly joggled sections 85 and 86 of the front plate 36 and the intermediate plate 37 respectively. The release catch 84 is secured to the end of a cable 89 by which means the release catch can be drawn from the position of FIG. 3 to the position of FIG. 4. In the position of FIG. 4 the release catch 84 is substantially clear of the plates 36 and 37 and, in fact, by slight clockwise rotation of the release catch, say through approximately 40°, it can be withdrawn from engagement with the hooked portion 80 of the locking piece 65. In the position of FIG. 4 the corner region 77 of the hook 52 is shown to have dropped into a recess 90 formed in the upper surface of the locking piece 65 thereby to permit anti-clockwise rotation of the hook 52 to the release position.

When the parts are in the position of FIG. 4 with the locking piece 65 retracted the stud 70 and aperture 68 co-operate to prevent the locking piece being returned to the right so as to enable ready assembly of the release catch 84 on to the hooked portion 80 of the locking piece 65. Thereafter finger pressure applied to the projecting surface 73 of the leaf spring will disengage the stud 70 from the aperture 68 and allow movement of the locking piece 65 to the right to the position it occupies in FIG. 3 whereafter the release catch cannot be removed from the hooked portion 80 due to the fact that it now underlies the collar 49 surrounding the rivet 48.

During insertion of the locking pin 27 which causes clockwise rotation of the hook 52 the corner region 77 of the hook will bear against the left-hand end 92 of the recess 90 so forcing the locking piece 65 to the left until the corner region 77 rides above the locking piece 65 at which time the locking piece will be spring biased back to the position shown in FIG. 3 so as to retain the hook 52 in its locked position. It will be appreciated that the leftward movement of the locking piece during this operation is not sufficient either to engage the stud 70 in the aperture 68 or to permit inadvertent release of the release catch 84 from the hooked portion 80 of the locking piece.

The manner in which the lower securing member 17 is connected to the rear plate 40 will now be discussed with particular reference to FIGS. 5 and 6. As shown in FIG. 6 in the assembled condition of these parts the member 17 and the rear plate 40 lie parallel to and closely adjacent one another. Referring to FIG. 5 it will be seen that the lower end of the lower securing member has a pair of spaced tubular hinge-like portions 94 and 95 which when the parts are assembled are arranged to receive in axial alignment a further tubular hinge-like portion 96 projecting from the rear plate 40. Apart from these co-operating portions of the lower securing member 17 and the rear plate 40 it will be seen from FIG. 5 that a major portion of the rear plate 40 is cut away as indicated at 98 this cut away region at each of its upper ends merging into a part key-hole shaped cut out 99 each of which is arranged to co-operate with a necked stud 100 secured to the inner face of the lower securing member 17. The lower securing member 17 also has a pair of small holes 101 which are arranged to co-operate with pins 102 projecting from the rear of the rear plate 40. Therefore to assemble the two parts 17 and 40 they are brought together at a slight angle to one another so that the necked studs 100 can slide up into the key-hole shaped cut outs 99 with the heads of the studs 100 trapped between the rear plate 40 and the intermediate plate 37. Thereafter the lower securing member 17 and the rear plate 40 can be brought into their parallel aligned relationship of FIG. 6 at which time the pins 102 will extend into the holes 101. Thereafter a locking member 103, which is of cylindrical form, can be inserted through the tubular hinge-like portions 94, 95 and 96 to secure these together. A circlip 104 engages in an inwardly facing recess 105 in the bore of the tubular hinge-like portion 94, as shown in FIG. 3, to secure the locking member in position.

In the normal way the locking member 103 retains the lower securing member and the rear plate connected at all times so that the lower section of the release unit is normally retained in one piece on the half 11 of the dinghy casing. The latching or unlatching of the upper half of the dinghy casing with respect to the lower half takes place by means of the locking pin 27 and the hook 52, the release being carried out by a tension being applied to the cable 89 in the manner already described. The cable 89 is conveniently used also to trigger off the inflation of the dinghy once the cable has moved to an extent which ensures that the two sections of the release unit have separated. As has been described, once the cable 89 has been drawn far enough to cause release, the release catch 84 can readily be removed from the hooked end 80 of the locking piece 65 but the locking piece is retained in its retracted position ready to receive the release catch when it is desired that it should be replaced.

The provision of the locking member 103, which is secured to a further cable 106, gives a secondary method of release of the two halves 10 and 11 of the dinghy casing in the event that malfunction of the lower section of the release unit should occur. Thus in the event of the application of a tension to the cable 89 failing to cause release of the locking pin 27 from the hook 52 a tension can then be applied to the cable 106 to draw the locking member 103 from the three aligned tubular hinge-like portions 94, 95 and 96 whereafter the whole of the lower section of the unit with the exception of the lower securing member 17 can move with the upper section 12 as the upper half 10 of the dinghy casing moves to an open position.

What I claim as my invention and desire to secure by Letters Patent is:

1. A releasable fastener comprising a body having a retaining catch mounted thereon for movement between a latching position, in which the catch can retain another part to the body, and a release position in which such part can separate from the body, a locking piece mounted on said body for movement between a first position in which it prevents movement of the retaining catch from the latching position to the release position and a second in which it permits such movement, a release member, means detachably connecting said release member to the locking piece so that a force applied to the release member can move the locking piece from the first to the second position, but said release member can be readily disconnected from the locking piece when, but only when the latter is in its second position, and readily releasable means for securing said body, together with its retaining catch and locking piece, to a securing member.

2. A releasable fastener as claimed in claim 1, including latching means to retain the locking piece in its second position.

3. A releasable fastener as claimed in claim 2 in which the latching means comprises a spring-biased member carried by the body and having a surface which is arranged to inter-engage a co-operating surface on the locking piece.

4. A releasable fastener as claimed in claim 3 in which the spring-biased member comprises a leaf spring having one end secured to the body and carrying a stud adjacent its free end which is positioned to co-operate with the margin of a hole in the locking piece.

5. A releasable fastener as claimed in claim 1 in which a spring is provided to bias the retaining catch to its release position.

6. A releasable fastener as claimed in claim 5 including a spring to bias the locking piece to its first position.

7. A releasable fastener as claimed in claim 6 in which the two springs are one and the same.

References Cited

UNITED STATES PATENTS

| 842,482 | 1/1907 | Matson | 24—230 |
|---|---|---|---|
| 2,634,147 | 4/1953 | Robertson | 292—216 |
| 2,727,774 | 12/1955 | Marple | 292—216 |
| 2,877,038 | 3/1959 | Kramer | 292—216 |
| 2,931,231 | 4/1960 | Felix | 292—216 X |
| 3,040,555 | 6/1962 | Wartian | 292—106 X |

RICHARD E. MOORE, Primary Examiner

E. J. McCARTHY, Assistant Examiner

U.S. Cl. X.R.

292—207